Feb. 9, 1932.  J. S. ALSPAUGH  1,844,550
GEAR SHIFT MECHANISM
Filed Dec. 22, 1930   2 Sheets-Sheet 1
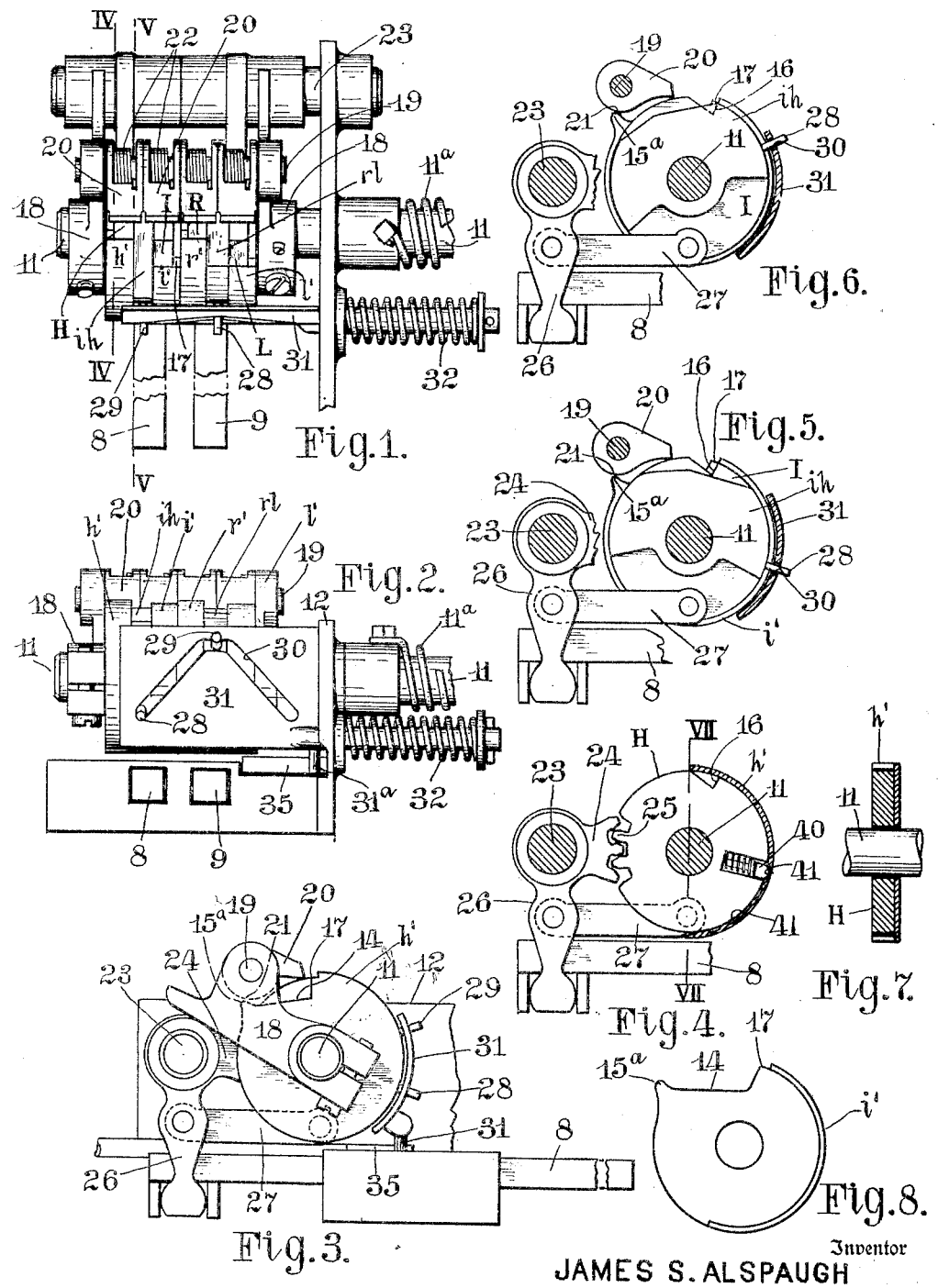
JAMES S. ALSPAUGH Inventor

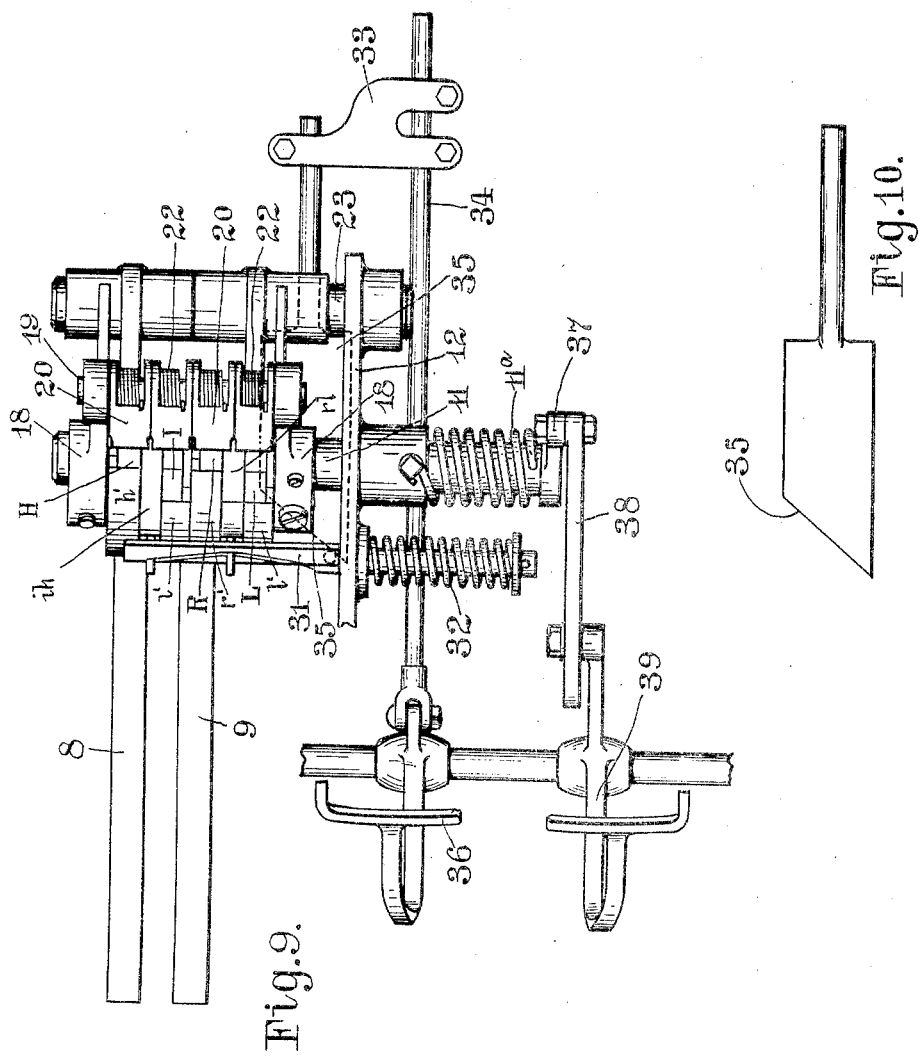

Patented Feb. 9, 1932

1,844,550

UNITED STATES PATENT OFFICE

JAMES S. ALSPAUGH, OF COLUMBUS, OHIO

GEAR-SHIFT MECHANISM

Application filed December 22, 1930. Serial No. 503,876.

The principal object of this invention is to provide a gear shift mechanism constructed on the principles or the type of the mechanism shown in United States Patent No. 1,462,530 issued to me July 24, 1923, with means for operating and controlling the operation of such mechanism by the brake and clutch levers thus dispensing with any manual work in the operation of the gear shifts.

Another object is to simplify the construction of the type of mechanism shown in said patent so that it is better adapted for foot operation of the gear shift mechanism.

Further objects may be gathered from the disclosure herein.

Generally, according to the invention there is provided two pairs of rock levers operated by the clutch lever, the members of each pair being connected together for reciprocable back and forth motion, one of said levers in each pair being connected with the gear shift mechanism, so that rocking of one member of a pair causes a movement of the gear shift means in one direction from a neutral position and the rocking of the other member causes a movement of the same gear shift, means in the opposite direction from the neutral position, bridging means to cause alternate actuation of the rock members of a pair by successive operation of the clutch lever, and setting or selector means operable by the brake lever to confine the actuations of the clutch lever to one pair or the other of said gear shifting rock levers.

In the accompanying drawings—

Figure 1 is a top plan view of the gear shifting mechanism according to the present invention with a part broken off and parts omitted.

Fig. 2 is an elevation looking up at the bottom of Fig. 1.

Fig. 3 is a side elevation looking at the left hand side of Fig. 1.

Fig. 4 is a detail in elevation and section on the line IV—IV Fig. 1 illustrating one of the gear shifting wheels.

Fig. 5 is a similar detail in elevation and section on the line V—V Fig. 1 illustrating the companion gear shifting wheel and the selector plate associated therewith.

Fig. 6 is a view similar to Fig. 5 showing the selector plate in bridging position.

Fig. 7 is a detail and section on the line VII—VII Fig. 4 showing the construction of the gear shifting wheel and the flange for the same affording a recess for the latching means.

Fig. 8 is a side view of the bridging disk or member looking toward the rim flange.

Fig. 9 is a plan view like Fig. 1 showing the brake and clutch levers and their connections for operating the gear shifting mechanism.

Fig. 10 is a detail in plan view of the cam plate for actuating the plate operated by the brake lever for selecting the pair of gear shifting wheels to be operated by the clutch lever.

In the views 9 designates the low and reverse gear shifting rod, while 8 designates the intermediate (or second) and high gear shifting rod. These rods are commonly present in gear shifting mechanisms of the type particularly referred to but the gears can be shifted without the intervention of such rods and are shown herein for illustrative purposes. In the present construction these rods 9 and 8 are operated by a forward stroke of the usual clutch lever, a rod 38 being connected with the foot pedal of that lever at the proper point for that purpose.

11 designates a shaft journaled in a suitable housing 12 to which the rod 38 is connected by a crank arm 37 so that upon pushing outward with the foot said shaft 11 is rocked in the forward direction, and upon releasing said lever of foot pressure said shaft is rocked in the rearward direction due to the action of the usual clutch spring (not shown) for engaging the clutch, supplemented, in the present instance by a spring 11ª on said shaft 11.

The shaft 11 has loose upon it two pairs of gear shifting wheels or levers suggestively designated R and L, and I and H. Each of said levers R, L, I and H is made with a notch to form a tooth 16 to be engaged by one of the actuating pawls 20. Between the members of each of said pairs and rockably mounted on the shaft 11 is a sector-like plate designated rl and ih respectively. These sector-like plates may be termed bridging members because when shifted they provide a bridge to prevent the engagement of a pawl with one tooth or the other of the members of the pair of gear shifting levers.

The levers R and L, and I and H, are inclosed at one face by a thin plate $r'$, $l'$, $i'$, and $h'$ respectively, said plates being provided at their rims with an integral flange in which are several sockets 41 engaged by a spring-pressed latch 40 for yieldingly holding the thin plate and gear shifting lever engaged in the operations. The thin plates $r'$, $l'$, $i'$ and $h'$ may also be termed bridging members, each being provided in conjunction with its rim a notch, the bottom 17 of which supports the beak of an actuating pawl 20 when the companion gear shift operating lever is being carried forward by the actuation of the pawl 20.

Secured to the shaft 11 at opposite ends of the whole group of levers and plates are end members 18 of a frame for carrying pawls 20 for engaging at their proper times the respective levers R, L, I, and H, said frame members having secured betwen them a shaft 19 on which said pawls 20 are pivoted. The said pawls are provided with a beak of such width as to engage the teeth 16 of the gear shift levers, the seat 17 and partially overlap their companion sector-like plate, referred to, and the rear or tail of the pawl at 21 engages the tooth $15^a$ of the companion plates for the purpose hereinafter explained. The beaks of the pawls are each held normally toward the rims of the gear shifting wheels and the bridging members by means of a coil spring 22, each connected at one end to the shaft 19 and bearing on the adjacent pawl at the other.

The members of each of the two pairs of gear shift-rod-operating wheels or levers are connected for reciprocal operation with reference to each other in contrary directions, that is to say when one lever or wheel of a pair is rocked forward the other is rocked rearward by means of a bell-crank lever, having one arm 24 provided with gear teeth engaging teeth 25 on the rim of one of the shifting levers, the two levers being coupled by means of a link 27 with the companion gear shifting lever. The other arm 26 of the bell-crank lever is extended to engage the gear shift rod to be operated. The bell crank lever of each pair of actuators is part of a sleeve mounted on shaft 23 for rocking operation independently of the other bell-crank lever.

The selector plates rl and ih which are loose on the shaft 11 are provided in their rims with pins 28 and 29 engaged with an inverted V-shaped slot 30 in a horizontally sliding curved plate 31. Said plate 31 is reciprocable to rock said sector plates into position to close and open the notches forming the teeth 16 of the companion gear shifting wheels or levers of one pair of shifting levers according to which lever of the pair of levers is to be operated by a pawl to shift the gears. The plate 31 is normally held by a spring 32 in position to permit the operation of the high and intermediate levers I and H, and said plate 31 is moved in the opposite direction by a cam member 35 that works against a pin $31^a$ on the cam plate to throw said plate 31 to reverse the positions of said selector plates and permit the actuation of the low and reverse levers L and R. The cam plate or member 35 is connected by means of a clamp member 33 to a rod 34 on the usual brake lever 36 and upon pressing said brake lever partially forward with the foot said plate 31 is shifted as just described. The parallel edges of the cam plate 35 permit pressing of the brake beyond this limit of the plate operating edge of the cam plate so as not to operate the cam when the brake needs to be pressed harder.

The pawl carrying frame is operated by a crank arm 37 on the shaft 11, said crank arm being connected by a link 38 with the clutch operating lever 39. The aforesaid pawls are held in retrieved or normal position by the pressure of the usual clutch spring aided by the spring $11^a$ as aforesaid fastened to the housing 12 and the shaft 11.

The normal position of the plate 31 is the high and second side and upon pushing forward the clutch pedal all the pawls are carried forward but only the pawl for actuating the lever I enters the notch thereof and therefore only the tooth 16 of said lever I and to rock said lever. The rocking of the lever I forward shifts the rod 9 forward to secure intermediate. It will be understood that in this operation the lever H is rocked rearward beyond neutral position but being loose on the shaft 11 rocks idly. In this rearward position of the H lever its tooth 16 is exposed and the beak of its operating pawl drops into it upon second forward operation of the clutch lever.

The selector members are held by the spring 32 in the position permitting the operation of the clutch to effect either the intermediate or high speed, and after the plate 31 is shifted or set by pressing down the brake lever either low or reverse may be obtained by the operation of the clutch lever. When the plate 31 has been shifted to operate the low and reverse said plate is held by the parallel portion of the cam plate until released by the release of the brake lever.

The construction is such that the clutch lever has sufficient free motion to release the clutch before a gear shifting operation takes place.

The gear shift levers and rods (if employed) are normally in neutral position and an actuation of the gear shift member or rod is either forward or rearward from its neutral position according to the lever that has its tooth exposed by the selector bridging plate for engagement by its actuating pawl.

When the particular gear shift lever is actuated all the bridging members (the thin plates) are advanced at the same time and on completion of such movement the shifted lever is left in the position to which thrown. Upon the return of the pawls all the said thin bridging members are returned to normal position thereby closing the notch of the shifting lever last operated so that its actuating pawl shall be bridged upon the next operation of the clutch lever. The retrieving movement of pawls is rearward beyond neutral and the notch of the companion gear shifting lever having been rocked rearward is left exposed. This operation is the same for each pair of rocking gear levers, but when one pair is being operated the other pair is rendered ineffective by the position of the selector bridging member.

The cut away portions in advance of the projections 15ª are shorter in the $h'$ and $r'$ thin plates than in the $i'$ and $l'$ plates to bridge the notches of those shifting levers that are not controlled by the selector, the plates with the longer cut away portions being actuated by their pawls first in shifting out of neutral when all the shifting levers are in neutral position.

In the drawings, and except as shown in Fig. 6, the parts are shown in neutral position and in position upon an actuation of the clutch lever to go into intermediate speed.

To go into low speed pressure is applied to the brake to shift the plate 31 to set the mechanism for both low and reverse and thereafter a single operation of the clutch lever engages the low speed gear. Upon a second operation of the clutch with the brake still applied reverse is obtained.

To go into second from standing position the brake is not applied and the plate 31 being in the position seen in Fig. 2 one release of the clutch obtains second speed.

To go into third from intermediate a second depression of the clutch lever obtains high or third speed.

Then to go from high to second the clutch only is depressed a third time with the brake still released.

To go directly from high to reverse the brake is applied until the car stops so as to avoid clashing or gear stripping, and then the clutch operated twice with brake applied.

When the emergency brake is connected with the foot brake, as is customarily the case, the operation of the emergency brake also shifts the selector setting plate 31 and therefore sets the mechanism for operation of low and reverse by the depressions of the clutch, as described.

The forms and arrangements of the parts can be changed without departing from the gist of the invention as claimed.

What I claim is:

1. In a speed changing gear shift mechanism for a motor vehicle, two pairs of gear shift levers, the members of each pair coupled for back and forth motion, means for actuating said levers, selective means operable by the brake pedal for rendering operable at will either pair of said gear shift levers independently of the other, and pedaled means for operating the actuators of the gear shift levers.

2. In a speed changing gear shift mechanism for a motor vehicle, two pairs of gear shift levers, the members of each pair coupled for back and forth motion, means for actuating said levers, shiftable bridging means for rendering operable at will either pair of said gear shift levers independently of the other, means operable by the brake operating means for shifting said bridging means and means operated by the clutch control means for operating the gear shift actuating means.

3. In a speed changing gear shift mechanism for a motor vehicle, two pairs of gear shift levers, the members of each pair coupled for back and forth motion, means for actuating said levers, shiftable bridging means for rendering operable at will either pair of said gear shift levers independently of the other, a cam plate operable by the brake operating means for shifting said bridging means and means operated by the clutch control means for operating the gear shift actuating means.

4. In a speed changing gear shift mechanism for a motor vehicle, two pairs of gear shift levers, the members of each pair coupled for back and forth motion, means for actuating said levers, shiftable bridging means for rendering operable at will either pair of said gear shift levers independently of the other, a cam having a restricted cam edge and operable by the brake operating means for shifting said bridging means and means operated by the clutch control means for operating the gear shift actuating means.

5. The combination in a motor vehicle, of two pairs of gear shift levers, the members of each pair being coupled for back and forth motion, pawls actuated by the clutch lever for operating said levers, a shiftable bridging sector member for each pair of pawls, and means consisting of a movable plate having a V-shaped slot engaging said bridging selector members to shift the same, and means operated by the brake lever for moving said V-shaped plate.

6. The combination in a motor vehicle, of two pairs of gear shift levers the members of each pair being coupled for back and forth motion, pawls for actuating said levers, means actuated by the clutch lever for operating said pawls, selector bridging members for the pawls and means for setting the selector bridging members to cause the operation of one pair only of the gear shift levers, said means operated by the brake pedal for setting the mechanism for operating at will either pair of said gear shift levers.

7. The combination in a motor vehicle, of two pairs of gear shift levers the members of each pair being coupled for back and forth motion, means actuated by the clutch lever for operating said levers, and means operated by the brake pedal for setting the mechanism for operating at will either pair of said levers.

8. In a motor vehicle, a gear shift mechanism of the type described and including two pairs of gear shift levers coupled for back and forth motion, means for actuating said levers, selector members for each pair of said levers and means operated by the foot for setting said selectors, and a distinct foot operated means for causing the operation of the gear shift actuating means.

JAMES S. ALSPAUGH.